United States Patent
Brandt

(10) Patent No.: US 8,194,717 B2
(45) Date of Patent: Jun. 5, 2012

(54) RESOURCE SHARING

(75) Inventor: Seemal Brandt, Farnborough (GB)

(73) Assignee: Nokia Corporation, Espoo (FI)

( * ) Notice: Subject to any disclaimer, the term of this patent is extended or adjusted under 35 U.S.C. 154(b) by 495 days.

(21) Appl. No.: 12/311,820

(22) PCT Filed: Oct. 13, 2006

(86) PCT No.: PCT/IB2006/002949
§ 371 (c)(1),
(2), (4) Date: Apr. 13, 2009

(87) PCT Pub. No.: WO2008/044086
PCT Pub. Date: Apr. 17, 2008

(65) Prior Publication Data
US 2010/0183049 A1 Jul. 22, 2010

(51) Int. Cl.
*H04B 1/00* (2006.01)
(52) U.S. Cl. ........................................ 375/134
(58) Field of Classification Search .............. 375/134, 375/130, 137, 138; 370/341, 338, 329; 709/223, 709/221, 224
See application file for complete search history.

(56) References Cited

U.S. PATENT DOCUMENTS

| 2005/0266868 A1 | 12/2005 | Fuccello |
| 2006/0056373 A1* | 3/2006 | Legg ............................ 370/341 |
| 2007/0226389 A1* | 9/2007 | Poortman ..................... 710/117 |

FOREIGN PATENT DOCUMENTS

| EP | 1 601 211 | 11/2005 |
| WO | 02/073430 | 9/2002 |
| WO | 2004031951 | 4/2004 |

OTHER PUBLICATIONS

International Search Report (Form PCT/ISA/210) (4 pages); PCT/IB2006/002949, Aug. 6, 2007.
H. Gan et al: "IEEE 802.15-00/367r1: Adaptive Frequency Hopping, a Non-collaborativ" Project: IEEE P802.15 Working Group for Wireless Personal Area Networks (WPANs), Mar. 12, 2001, pp. 1-40, XP002306207.

* cited by examiner

Primary Examiner — Khai Tran
(74) Attorney, Agent, or Firm — Locke Lord LLP

(57) ABSTRACT

A method comprising: determining which of a first process and a second process uses a first resource, wherein the first process requires use of a first resource to produce a result and the second process competes with the first process for use of the first resource; and controlling the first process, when the second process uses the first resource, to produce a result without use of the first resource.

20 Claims, 4 Drawing Sheets

US 8,194,717 B2

RESOURCE SHARING

FIELD OF THE INVENTION

Embodiments of the present invention relate to resource sharing. In particular, they relate to ameliorating adverse effects produced by resource sharing.

BACKGROUND TO THE INVENTION

If two or more RF technologies operate in the same device and share common frequency band, it is not possible to transmit/receive simultaneously in the same device.

A problem arises if the circuitry for a first technology is performing a procedure that requires communication but does not have use of an antenna. It is likely that the procedure will be corrupted or take a long time to complete.

As an example, without loss of generality, on the current implementation of HCl and Link Manager Protocol in Bluetooth, when an audio link is established adaptive frequency hopping (AFH) is enabled and local channel assessment is done by both Master and Slave devices. The Master and Slave each create a local channel classification report. The Slave report is provided to the Master which uses the classification reports to update the AFH channel map.

The AFH channel map is then sent to the Slave and used by both Master and Slave to define the channels they will both use.

If the Master (or Slave) shares an antenna with other transceiver circuitry such as WLAN circuitry, it is not possible for the Bluetooth circuitry and the WLAN circuitry to share the antenna simultaneously. Use of the antenna is therefore granted to only one of the Bluetooth circuitry and the WLAN circuitry at a time.

A problem arises if the Bluetooth circuitry is performing the AFH procedure but does not have use of the antenna. It is likely that the classification report created will be corrupt. This may result in an inaccurate AFH channel map and therefore greater interference in the Bluetooth connection resulting in lower audio quality.

A similar problem arises whenever two unsynchronized processes compete for use of a resource and a first process uses the resource on an on-going basis, but such use is not taken account or given low weight in the arbitration decision that determines which of the processes should use the resource. The result produced by the first process may be corrupted if the first process continues without use of the resource or the data rate is reduced.

BRIEF DESCRIPTION OF THE INVENTION

According to one embodiment of the invention there is provided a method comprising: determining which of a first process and a second process uses a first resource, wherein the first process requires use of a first resource to produce a result and the second process competes with the first process for use of the first resource; and controlling the first process, when the second process uses the first resource, to produce a result without use of the first resource.

In some embodiments, the function of the first resource in the first process is emulated (without use of the first resource) to produce an emulated result. This prevents production of a corrupt result.

According to another embodiment of the invention there is provided a controller comprising circuitry for: determining which of a first circuitry and second circuitry uses a first resource, wherein the first circuitry uses the first resource to produce a result and the second circuitry competes with the first circuitry for use of the first resource; and providing the result to the first circuitry, when the second circuitry uses the first resource.

According to another embodiment of the invention there is provided a computer program comprising computer program instructions for determining which of a first circuitry and second circuitry uses a first resource, wherein the first circuitry uses the first resource to produce a result and the second circuitry competes with the first circuitry for use of the first resource; and enabling the provision of the result to the first circuitry, when the second circuitry uses the first resource.

According to another embodiment of the invention there is provided a method comprising: determining which of a first frequency hopping spread spectrum (FHSS) communication protocol and a second direct sequence spread spectrum (DSSS) communication protocol uses an antenna, wherein the first FHSS communication protocol requires use of the antenna to produce an adaptive frequency hopping map and the second DSSS communication protocol competes with the first FHSS communication protocol for use of the antenna; and controlling the first FHSS communication protocol, when the second DSSS communication protocol uses the antenna, to produce an adaptive frequency hopping map without use of the antenna.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
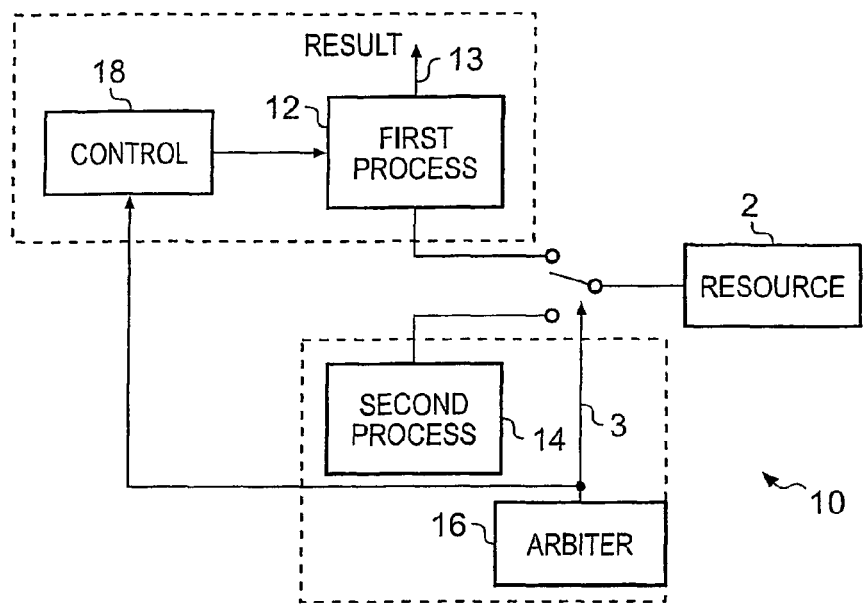
FIG. 1 schematically illustrates an apparatus.

FIG. 1 schematically illustrates an apparatus 10 comprising: a resource 2; first circuitry 12 for performing a first process that requires use of the resource 2 to produce a result 13; second circuitry 14 for performing a second process that competes with the first process for use of the resource 2; arbitration circuitry 16 for determining which of the first process and the second process use the resource 2; and control circuitry 18 for controlling the first process, when the second process uses the first resource, to generate a result 13 without use of the resource 2.

The resource in this example is a single antenna. In other embodiments, it may be considered to be a frequency space used by one or more antennas or the device(s) used to access that frequency space.

'Circuitry' as used in this description encompasses both dedicated circuitry such as application specific integrated circuits (ASICs) and programmable circuitry such a field programmable gate arrays (FPGA) or computers. A computer comprises a processor for carrying out instructions and a memory for storing instructions either permanently (firmware) of temporarily (software).

Figure 5:
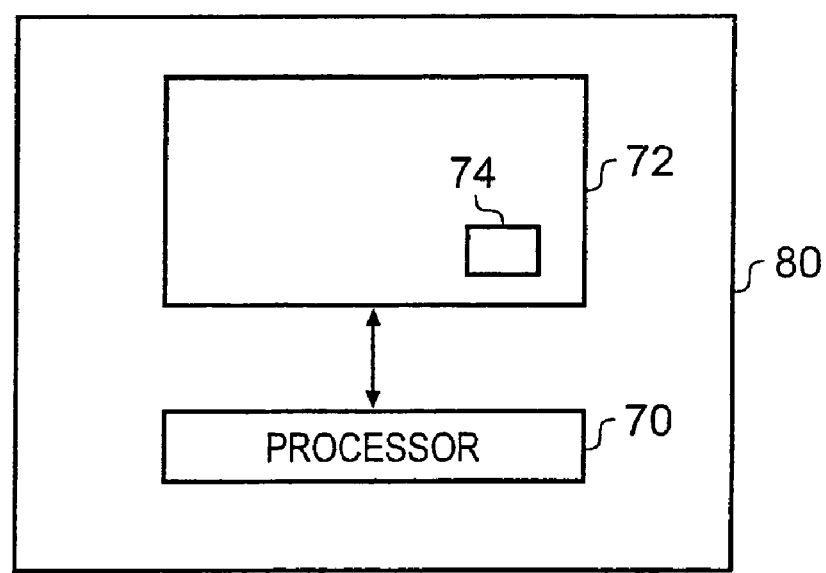
FIG. 5 schematically illustrates an example of a computer.
Figure 5:

FIG. 5 schematically illustrates an example of a computer 80 comprising a processor 70 and memory 72. The memory 72 stores computer program instructions 74 that control the operation of the circuitry when loaded into the processor 70.

Although the various circuitry 12, 14, 16, 18 is illustrated and described separately, it should be understood that the circuitry may be physically co-located such as integrated in the same chip or carried on the same chipset.

Figure 3:
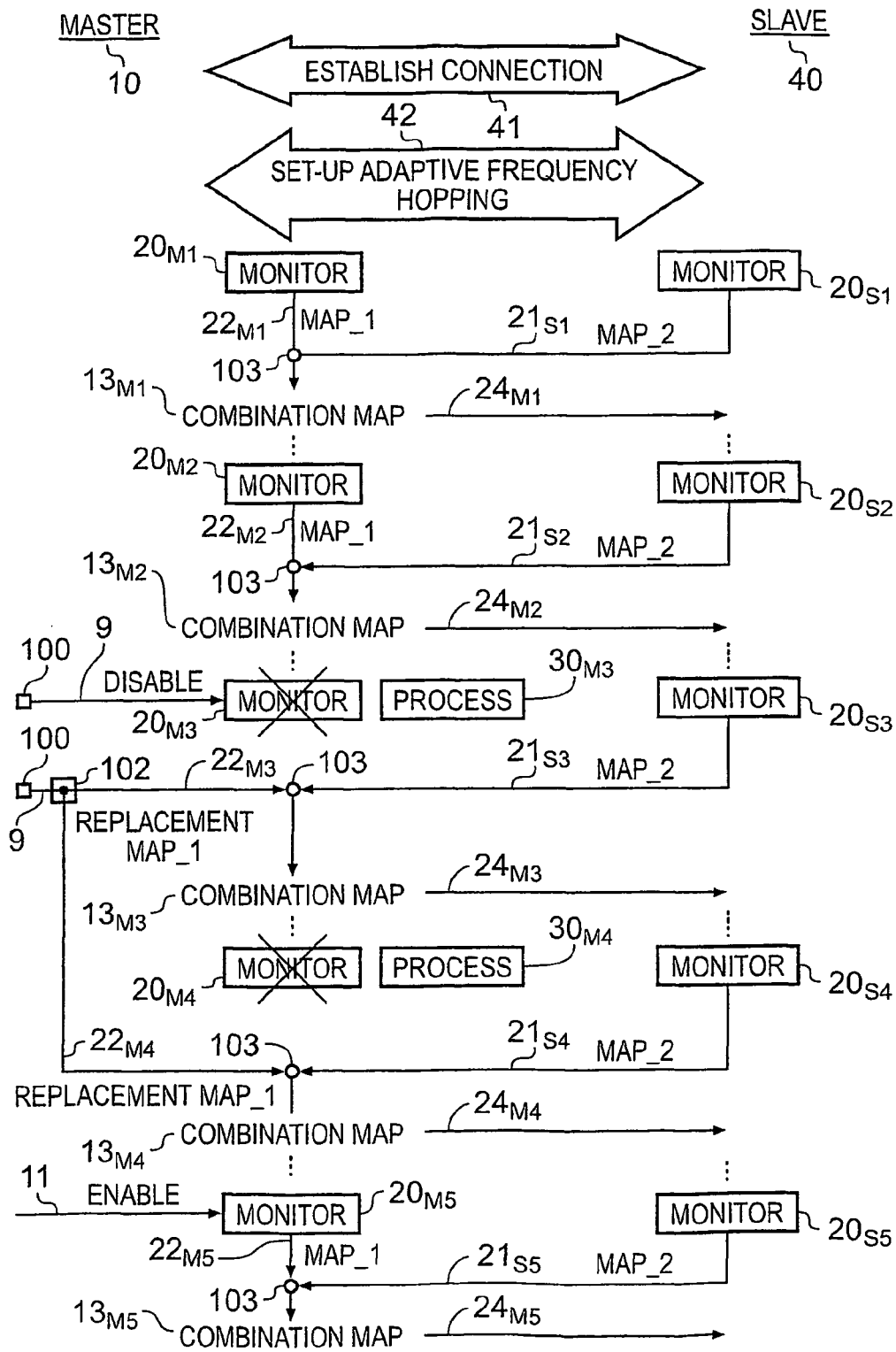
FIGS. 3 and 4 schematically illustrate a method for managing the effects of sharing a resource.
Figure 4:
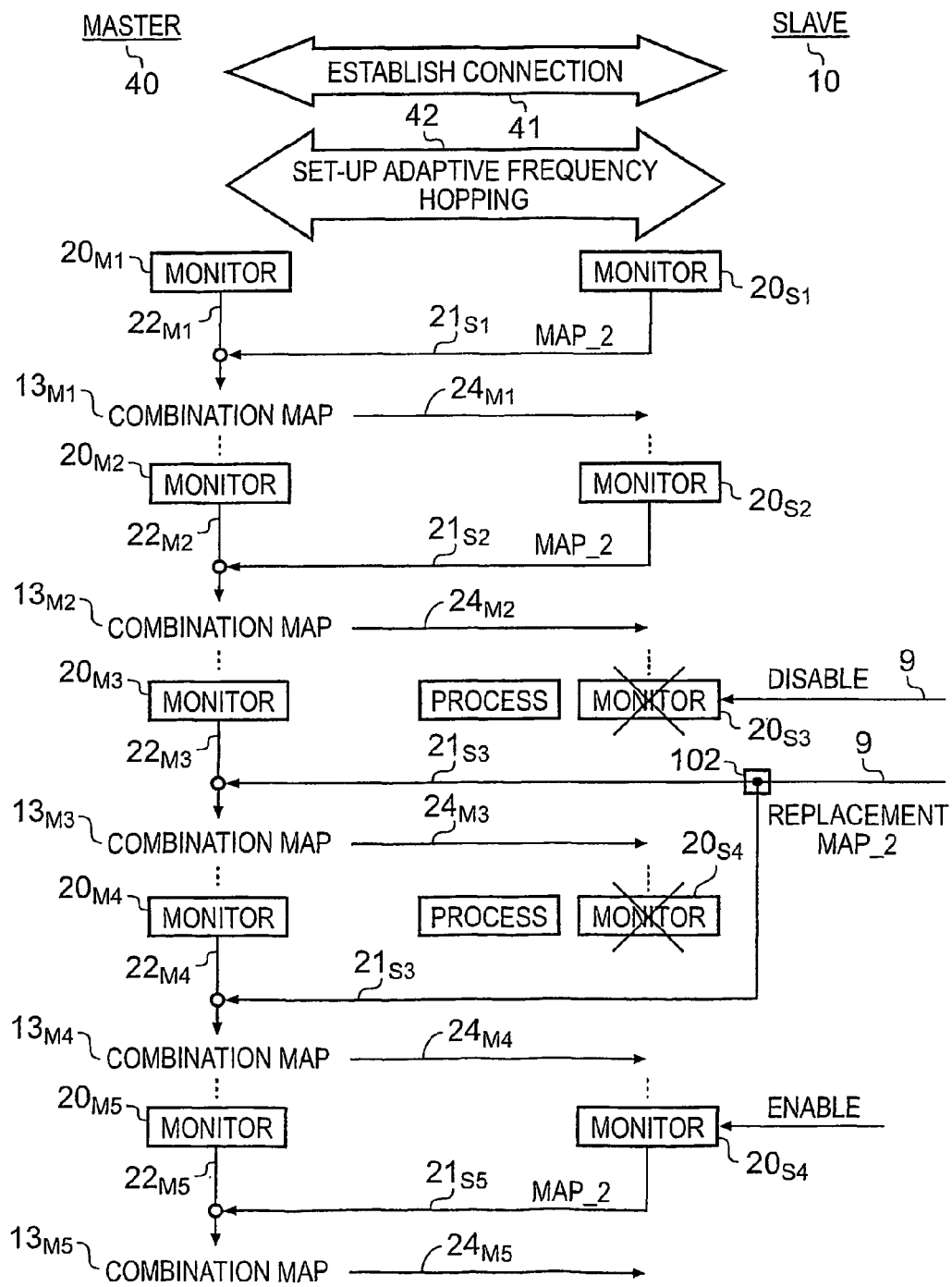

FIGS. 3 and 4 schematically illustrate a method for managing the effects of sharing the resource 2 between the first circuitry 12 and the second circuitry 14.

In FIG. 3 a Master device 10 and a Slave device 40 are illustrated. The devices communicate 41 to establish a radio link connection. They then use 42 the established radio link connection to set-up adaptive frequency hopping (AFH).

In FIG. 4 a Master device 40 and a Slave device 10 are illustrated. The devices communicate 41 to establish a radio link connection. They then use 42 the established radio link connection to set-up adaptive frequency hopping (AFH).

Once the AFH procedure has been initiated, it continues automatically as a Link Layer procedure until it is disabled. The Master 10 and Slave 40 periodically monitor interference, combine the interference reports 21, 22 and share the combined report 13.

The Master and Slave are therefore able to use the combined report 13 to avoid 'bad' or 'occupied' communication channels when they hop frequencies. This results in more reliable communications.

The AFH procedure is particularly useful when latency sensitive data, such as audio data, is being sent. This may be sent via a synchronous connection oriented (SCO) connection.

Adaptive frequency hopping is a procedure defined in versions 1.2 and 2.0 of the Bluetooth Standard. According to this procedure, the Slave device periodically monitors $20_{sn}$ at times $t_0+nT$ the specified frequency channels where n=1, 2, 3 and the period is T. Monitoring involves measuring the output of antenna 2 for each of the frequency channels. The Slave uses these measurements to determine the presence or absence of radio traffic in those channels. The Slave incorporates this information into a classification report 21 which is sent to the Master.

The Master device periodically monitors $20_{mn}$ at times $t_0+nT$ the specified frequency channels. Monitoring involves measuring the output of antenna 2 for each of the frequency channels. The Master uses these measurements to determine the presence or absence of radio traffic in those channels, where n=1, 2, 3 and the period is T. The Master incorporates this information into a classification report 22 which is combined with the classification report 21 received from the Slave to create a final report 13.

The reports 21 and 22, in the example of the current Bluetooth Standard, contain 40 2-bit fields that classify the channels. The mth field is used for a pair of associated channels—channel 2m and 2m+1. The field has the value 0 if the status of one of the associated pair of channels is unknown. The field has the value 1 if the status of both of the associated pair of channels is good. The field has the value 3 if the status of one of the associated pair of channels is bad. The reports 21, 22 are therefore maps of available/unavailable channels.

The final report (AFH_Channel_Map) 13 also contains 79 1-bit fields that classify the channels. The mth field is used for the channel m. The field value has the value 0 if the channel is unused and the value 1 if the channel is used.

The final report 13 is retained at the Master and also sent 24 to the Slave. The final report 13 is used by the Master and Slave to synchronize the fast channel hopping used in the established link connection. The final report 13 operates as a 'black' or 'forbidden' list that excludes certain identified channels from use because they are unavailable.

Figure 2:
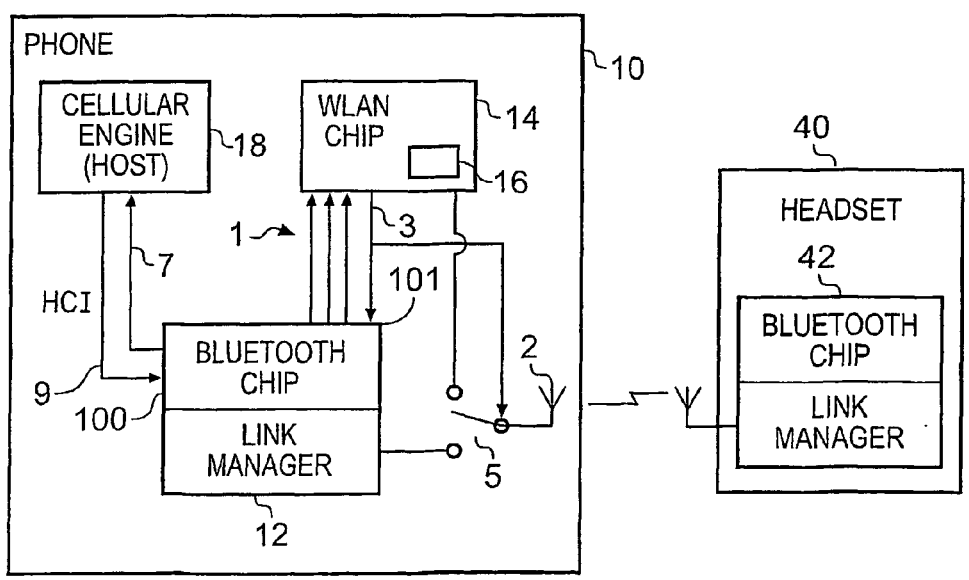
FIG. 2 schematically illustrates the apparatus communicating with another apparatus.

Referring to FIG. 2 an antenna resource 2 is shared between Bluetooth circuitry 12 and circuitry 14 that transmits and/or receives in the frequency spectrum that overlaps Bluetooth's frequency spectrum (ISM 2.4 GHz). The circuitry 14 may, for example, be WLAN circuitry. It is not possible for both the Bluetooth circuitry 12 and WLAN circuitry 14 to use the antenna 2 simultaneously. Bluetooth is a frequency hopping spread spectrum (FHSS) whereas WLAN is a direct sequence spread spectrum (DSSS) communication protocol.

In this example a hand-portable electronic device 10 such as a mobile cellular telephone, personal digital assistant, personal music player, communicates with audio equipment 40 such as headset or loudspeaker using the Bluetooth communication protocol. The Bluetooth circuitry 12 in the device 10 is used to communicate audio data to corresponding Bluetooth circuitry 42 in the audio equipment 40.

The electronic device 10 and audio equipment 40 operate as a Master Slave pair, but either may be the Master depending upon circumstances. FIG. 3 illustrates a method for managing the effects of sharing the antenna 2 between the Bluetooth circuitry 12 and the WLAN circuitry 14 when the electronic device 10 operates as Master. FIG. 4 illustrates a method for managing the effects of sharing the antenna 2 between the Bluetooth circuitry 12 and the WLAN circuitry 14 when the audio equipment 40 operates as Master.

The arbitration circuitry 16 is incorporated within the WLAN circuitry 14 in this example.

The Bluetooth circuitry 12 and WLAN circuitry 14, in this example, are designed to share a common antenna 2. This is achieved by means of a 3-pin (or 4-pin) interface 1 between the Bluetooth circuitry 12 and the WLAN circuitry 14.

RF_ACTIVE signal is activated by the Bluetooth circuitry 12 before the beginning of any Bluetooth TX or RX activity, and disabled at the end of that timeslot.

STATUS signal follows the RF_ACTIVE signal to indicate a high priority Bluetooth slot, such as a SCO packet during Bluetooth audio link.

The arbiter 16 within the WLAN circuitry has ultimate control over the antenna switch 5, and makes a decision based upon RF_ACTIVE and STATUS signal inputs whether to give Bluetooth the access to the shared antenna 2.

When Bluetooth is denied access to the antenna the arbiter 16 of the WLAN circuitry 14 activates its TX_CONFX output 3, which is active for the slot duration for which it occupies the antenna 2.

The arbitration circuitry 16 of the WLAN circuitry 14 allows high priority Bluetooth traffic, and whenever possible also low priority Bluetooth traffic depending upon its decision algorithm. The TX_CONFX signal switches off the RF front end in the Bluetooth circuitry 12.

When the WLAN circuitry 14 arbitrates that it should use the antenna resource 2 it sends a switching signal 3 to a switch 5 which switches the antenna from connection to the Bluetooth circuitry 12 to connection to the WLAN circuitry 14. The switching signal 3 is also sent to the Bluetooth circuitry 12 or directly to control circuitry 18.

If the Bluetooth circuitry is involved in AFH then the Bluetooth circuitry may influence the AFH procedure to prevent the creation of a corrupt scanning report 21, 22 should the scanning period overlap the period when the Bluetooth circuitry 12 does not have use of the antenna.

The AFH procedure is a Link Layer procedure and it therefore proceeds automatically until it is terminated. The Bluetooth circuitry 12 has been adapted so that corruption of the AFH procedure is ameliorated without terminating the AFH procedure.

In one embodiment, the host circuitry 18 adopts a systematic approach based upon functionality enabled in Bluetooth circuitry 12 and in the WLAN circuitry 14 to determine the occurrence of a possible coincidence between a scheduled monitoring period of the AFH procedure at the Bluetooth circuitry 12 and a period when the Bluetooth circuitry 12 does not have access to the antenna 2.

When there is to be coincidence between a scheduled monitoring period of the AFH procedure at the Bluetooth circuitry 12 and a period when the Bluetooth circuitry 12 does not have access to the antenna 2, the Host circuitry provides a first control signal 9. This first control signal 9 instructs the Bluetooth circuitry to generate a final report (AFH_Channel_Map) 13 without use of the antenna 2.

This control signal 9 instructs the Bluetooth circuitry to generate a classification report 22 (FIG. 3), 21 (FIG. 4) in which the status of all the channels has a predetermined value. The 40 2-bit fields in the report may all, for example, have a zero value indicating an unknown status. The Host can send channel classification information for generating the classification report 21 (FIG. 4), 22 (FIG. 3) to the Bluetooth circuitry using the HCl command Set AFH_Channel_Classification command.

Alternatively, a classification report 21 (FIG. 4), 22 (FIG. 3) may be stored locally in a memory by the Bluetooth circuitry and the pre-existing locally stored report may be 'generated' by accessing the memory. The trigger for accessing the stored classification report may be the control signal 9 or the switching signal 3.

The report 21 (FIG. 4), 22 (FIG. 3) is then processed normally to create the final report 13.

Alternatively, in other implementations, the control signal 9 instructs the Bluetooth circuitry to generate a final report 13. The Host may send the final report 13 to the Bluetooth circuitry.

Alternatively, a final report 13 may be stored locally in a memory by the Bluetooth circuitry and the pre-existing locally stored final report 13 may be 'generated' by accessing the memory. The trigger for accessing the stored final report may be the control signal 9 or the switching signal 3.

The same or a different control signal 9 may also be used to disable monitoring, which switches off the Bluetooth RF circuitry used for measurements thereby saving power. The host 18 may enable or disable local monitoring by the HCl command Write_AFH_Channel_Classification_Mode.

When there is to no longer coincidence between a scheduled monitoring period of the AFH procedure at the Bluetooth circuitry 12 and a period when the Bluetooth circuitry 12 does not have access to the antenna 2, the Host circuitry provides a second control signal 9 to the Bluetooth circuitry 12. This second control signal 9 enables the use of a locally measured report 21 (FIG. 4), 22 (FIG. 3) and, if necessary, enables the Bluetooth circuitry to resume periodic monitoring 20.

It will therefore be appreciated that FIG. 3 schematically illustrates a method comprising: determining which of a first process 20 and a second process 30 uses the resource 2, wherein the first process 20 requires use of the resource 2 to produce a result 13 and the second process 30 competes with the first process 20 for use of the resource 2; and controlling the first process 20, when the second process 30 uses the resource 2, to provide a result 13 without use of the resource 2.

FIG. 3 also schematically illustrates functional circuitry. The circuitry comprises: first circuitry $20_{mn}$ arranged to accesses a first resource to produce as results, an intermediate result (classification report $22_{mn}$) and a final result (final report $13_{mn}$). The circuitry also comprises an input for receiving an external signal (input 101 for receiving an external switching signal 3 or input 100 for receiving external control signal 9) that determines whether the first circuitry $20_{mn}$ or additional circuitry is used to produce a result.

The circuitry also comprises additional circuitry 102 arranged to produce, as an intermediate result, without use of the first resource, a replacement classification report by decoding the received control signal 9.

The circuitry also comprises additional circuitry 103 arranged to produce, as a final result, without use of the first resource, a final report 13 by, for example, combining a replacement classification report with one or more previously received classification reports $21_{mn}$.

It will therefore be appreciated that FIG. 4 schematically illustrates a method comprising: determining which of a first process 20 and a second process 30 uses the resource 2, wherein the first process 20 requires use of the resource 2 to produce a result 13 and the second process 30 competes with the first process 20 for use of the resource 2; and controlling the first process 20, when the second process 30 uses the resource 2, to generate a result 13 without use of the resource 2.

FIG. 4 also schematically illustrates functional circuitry. The circuitry comprises: first circuitry $20_{sn}$ arranged to accesses a first resource to produce as an intermediate result (classification report $21_{sn}$). The circuitry also comprises an input for receiving an external signal (input 101 for receiving an external switching signal 3 or input 100 for receiving external control signal 9) that determines whether the first circuitry $20_{sn}$ or additional circuitry 102 is used to produce a result.

The circuitry also comprises additional circuitry 102 arranged to produce, as an intermediate result, without use of the first resource, a replacement classification report 21 by decoding the received signal 9.

FIGS. 3 and 4 illustrate the situation where AFH is on-going before the WLAN circuitry 12 takes control of the antenna 2. However, the process is the same if AFH is set-up after the WLAN circuitry 12 is operational and using the antenna 2. The AFH procedure is set-up, but the control circuitry 18 which is informed that the second circuitry has control of the shared resource 2, prevents local channel monitoring being used in producing the final report 13 but instead enforces the use of a replacement default report in generating the final report 13.

Referring to FIG. 5, the computer program instructions 70 enable the control circuitry 18 to respond to the switching signal 3, which may be provided directly to the control circuitry, and provide the control signals 9 that enable/disable generation of a report 21 (FIG. 4), 22 (FIG. 3) instead of local measurement to create a report. The computer program 70 determines when there is coincidence between a scheduled monitoring period of the AFH procedure at the Bluetooth circuitry 12 and a period when the Bluetooth circuitry 12 does not have access to the antenna 2. The computer program 70 disables local channel assessment for the duration of simultaneous local WLAN activity, and enables local channel assessment again when WLAN activity is complete.

The computer program instructions may arrive at the electronic device 10 via an electromagnetic carrier signal or be copied from a physical entity 76 such as a computer program product, a memory device or a record medium such as a CD-ROM or DVD.

Although embodiments of the present invention have been described in the preceding paragraphs with reference to various examples, it should be appreciated that modifications to the examples given can be made without departing from the scope of the invention as claimed.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
controlling a first communication process that competes with a second communication process for use of a first antenna resource, when the first communication process has access to the first antenna resource, to produce a communication report using the first antenna resource; and
controlling the first communication process, when the second communication process has access to the first antenna resource, to produce the communication report without use of the first antenna resource.

2. A method as claimed in claim 1, wherein the first communication process obtains the communication report or obtains information for generating the communication report without use of the first antenna resource when the second communication process has access to the first antenna resource.

3. A method as claimed in claim 1, wherein the first communication process includes sequential periodic processes each of which is for producing the communication report.

4. A method as claimed in claim 1, wherein the first communication process is controlled to produce the communication report without use of the first antenna resource, when the second communication process uses the first antenna resource at a time coincident with a monitoring process associated with the first communication process and wherein the first communication process is controlled to produce the communication report with use of the first antenna resource, when the second communication process does not use the first antenna resource at a time coincident with a monitoring process associated with the first communication process.

5. A method as claimed in claim 1, wherein the communication report, produced without use of the first antenna resource when the second communication process has access to the first antenna resource, is obtained from one of the following group:
circuitry controlling the first communication process;
a host hosting circuitry performing the first communication process;
circuitry that controls whether the first communication process uses a first antenna resource.

6. A method as claimed in claim 1, wherein the first communication process is a measurement process for obtaining measurements for the communication report.

7. A method as claimed in claim 6, wherein the communication report comprises a classification report.

8. A method as claimed in claim 1, wherein the communication report is transmitted.

9. A method as claimed in claim 1, wherein the communication report comprises a map of available/unavailable channels.

10. A method as claimed in claim 1, wherein the communication report comprises an indication of interference in a plurality of radio channels.

11. A method as claimed in claim 1, wherein the first antenna resource is at least one antenna.

12. A method as claimed in claim 1, wherein the first antenna resource uses a predetermined frequency space for transmission and/or reception.

13. A method as claimed in claim 1, wherein the communication report is for use in adaptive frequency hopping.

14. An apparatus comprising:
at least one processor;
and at least one memory including computer program code,
the at least one memory and the computer program code configured to, with the at least one processor, cause the apparatus at least to perform;
controlling a first communication process that competes with a second communication process for use of a first antenna resource, when the first communication process has access to the first antenna resource, to produce a communication report using the first antenna resource; and
controlling the first communication process, when the second communication process has access to the first antenna resource, to produce the communication report without use of the first antenna resource.

15. An apparatus as claimed in claim 14, wherein the communication report, produced without use of the first antenna resource, is received from one of the group:
a source external to the apparatus
a source within the apparatus
a memory accessed by the second communication circuitry
a host hosting the apparatus
circuitry that provides the external signal.

16. An apparatus as claimed in claim 14, wherein the at least one memory and the computer program code are configured to, with the at least one processor, further cause the apparatus at least to performs a measurement to obtain measurements for the communication report.

17. An apparatus as claimed in claim 14, wherein the communication report comprises a map of available/unavailable channels.

18. An apparatus as claimed in claim 14, wherein the first antenna resource is at least one antenna.

19. An apparatus as claimed in claim 14, wherein the apparatus is a chipset.

20. A computer program product comprising a physical entity embodying computer program instructions for:
controlling a first communication process that competes with a second communication process for use of a first antenna resource, when the first communication process has access to the first antenna resource, to produce result a communication report using the first antenna resource; and
controlling the first communication process, when the second communication process has access to the first antenna resource, to produce the communication report without use of the first antenna resource.

* * * * *